United States Patent [19]

Markle

[11] Patent Number: 5,164,794
[45] Date of Patent: Nov. 17, 1992

[54] OPTICAL RETICLE INSPECTION SYSTEM AND METHOD

[75] Inventor: David A. Markle, Santa Clara, Calif.

[73] Assignee: General Signal Corporation, Stamford, Conn.

[21] Appl. No.: 729,941

[22] Filed: Jul. 15, 1991

[51] Int. Cl.⁵ .............................................. G01B 11/00
[52] U.S. Cl. .................................................. 356/394
[58] Field of Search ................ 356/71, 388, 391, 392, 356/393, 394

[56] References Cited

U.S. PATENT DOCUMENTS

| | | | |
|---|---|---|---|
| 3,817,626 | 6/1974 | Lietar | 356/394 |
| 3,873,212 | 3/1975 | Shell | 356/394 |
| 4,964,705 | 10/1990 | Markle | 350/442 |

*Primary Examiner*—F. L. Evans
*Attorney, Agent, or Firm*—Stephen E. Baldwin; George Seligsohn

[57] ABSTRACT

An optical reticle inspection system and method employing a photolithographic projection optical system. The present invention provides for imaging a reticle pattern to be inspected onto a complementary reticle pattern and directly viewing the obscured image pattern to provide a measure of the fidelity of the reticle patterns.

5 Claims, 3 Drawing Sheets

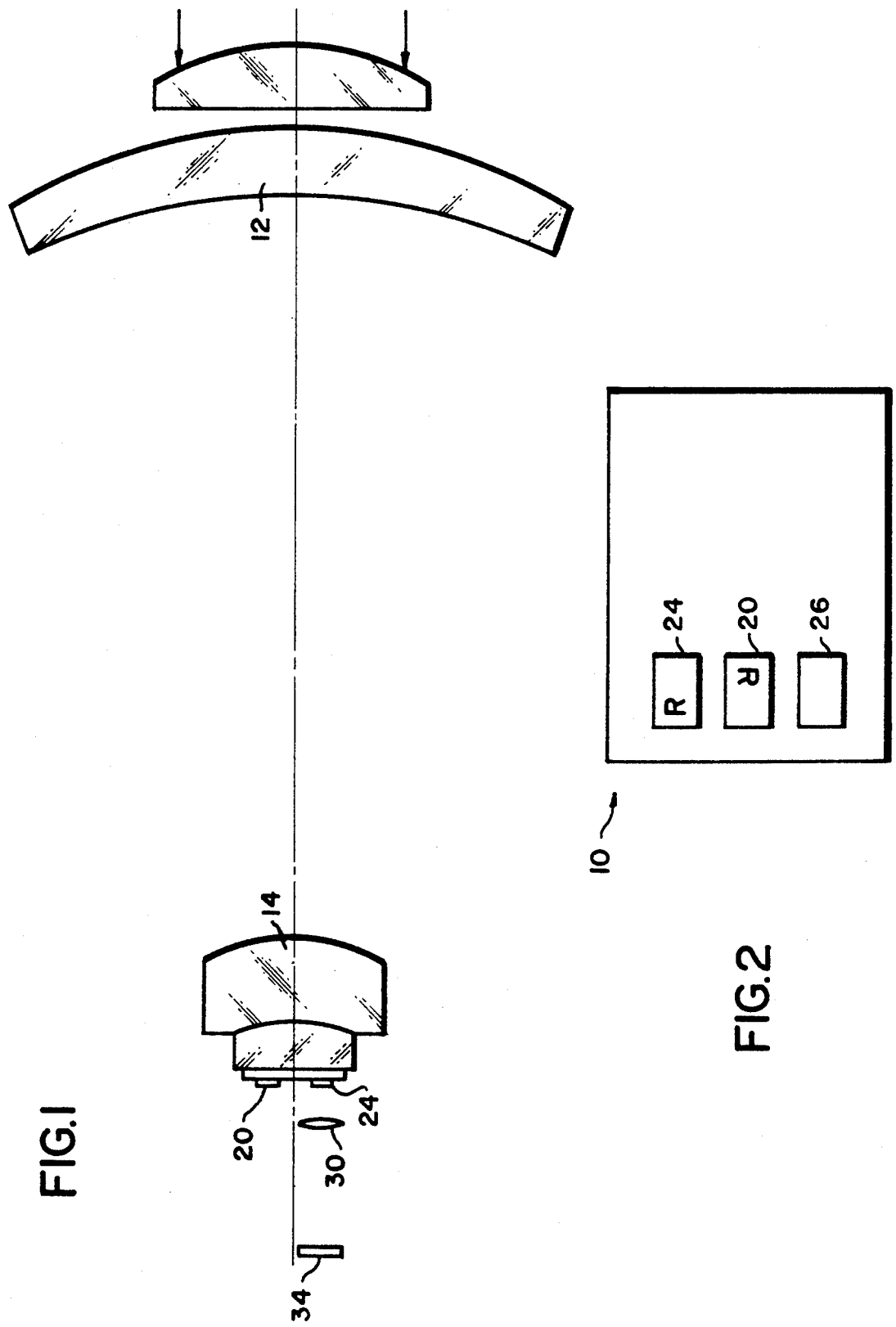

OPTICAL RETICLE INSPECTION SYSTEM AND METHOD

BACKGROUND OF THE INVENTION

The present invention relates to an improved optical reticle inspection system and method. The present invention is an improvement of a unit magnification optical system described in U.S. Pat. No. 4,964,705, issued Oct. 23, 1990, and assigned to the same assignee as the present invention, the details of which are hereby incorporated by reference.

Optical reticle inspection techniques are, of course, very important in photolithographic systems used in the formation of semiconductor chips on a wafer.

Prior art approaches in connection with optical reticle inspection techniques have illuminated a small portion of a reticle pattern and re-imaged that small pattern onto a complementary portion of another reticle pattern. Prior art approaches sometimes process one pixel at a time, which is an extremely slow technique.

Such techniques can find defects in the reticle pattern, such as a nick out of a line, a missing corner and the like. However, such prior art approaches depend to a certain extent on the overall pattern integrity and cannot determine whether an edge of the reticle pattern is falling exactly where it should (or not). Unless there is a very evident defect, such as an extra piece of chrome (or a missing piece of chrome), a bite or a spot, prior art approaches have trouble measuring exactly how accurately the pattern of one reticle would overlay that on another reticle.

SUMMARY OF THE INVENTION

It is an object of the present invention to provide an improved optical reticle inspection system and corresponding method therefor.

In one preferred embodiment, the present invention utilizes a photolithographic projection optical system known as a ½ Dyson optical system.

The present invention includes means for illuminating one-half of an optical field containing a reticle pattern to be inspected. The system further includes means for re-imaging the reflected light from this reticle pattern onto the other half of the field which contains a complementary reticle pattern.

The system further includes means for directly comparing the entire reticle and complementary reticle patterns to provide a measure of their overlay fidelity (rather than the distortion of the projection system itself).

Other objects, features and advantages of the present invention will become apparent from the following detailed description when taken in conjunction with the accompanying drawings.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1 depicts a cross-sectional view of an improved optical reticle inspection system according to the present invention.

FIG. 2 depicts a view of the reticle, the reticle pattern, and its complementary pattern which could be inspected by the optical reticle inspection system of FIG. 1.

DETAILED DESCRIPTION OF THE PREFERRED EMBODIMENTS

Figure 3A:
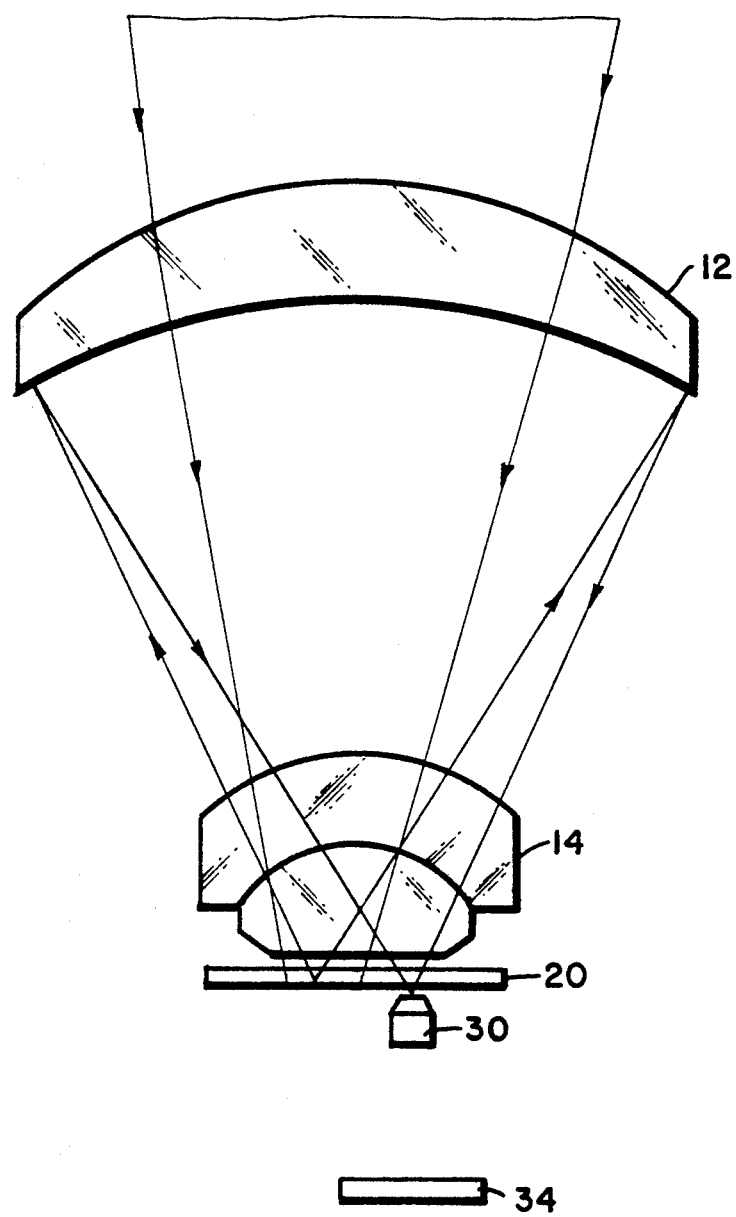
FIGS. 3a and Eb, respectively, depict bright field and dark field illumination of the optical reticle being inspected.

Reference will now be made in detail to the preferred embodiments of the invention, examples of which are illustrated in the accompanying drawings. While the invention will be described in conjunction with the preferred embodiments, it will be understood those embodiments. On the contrary, the invention is intended to cover alternatives, modifications and equivalents, which may be included within the spirit and scope of the invention as defined by the appended claims.

Referring now to FIG. 1, a cross-sectional view an optical reticle inspection system 10 according to the present invention is depicted.

As previously described above, the present invention is an improvement of U.S. Pat. No. 4,964,705. One aspect of the present invention permits an air gap to be dispensed with because the object and image are on the same glass blank, and in a common image plane.

As shown in FIG. 1, illumination enters the system 10 through the partially transparent coating of a Wynne-Dyson primary mirror 12 and lens group 14, and illuminates one-half of the field which contains the reticle pattern 20 to be inspected The aluminum (or perhaps chrome) features the other half of the field. This portion of the reticle contains a duplicate pattern 24 which is rotated 180° to match the rotation that occurs on imaging through a Wynne-Dyson system.

Thus the duplicate pattern 24 should intercept almost all of the light reflected from the first pattern 20 and very little light should pass through the duplicate pattern 24 to the microscope 30 and detector array 34. Of course, there will be a little light even if the center of the two patterns is perfectly aligned with the center of the optical system 10 because of the limited resolution of the Wynne-Dyson lens.

If there is an opaque (aluminum) defect on the reticle 20, or a clear defect on the duplicate pattern 24, then considerably more light will get through. This property allows the finding of defects simply by scanning a detector array 34 across the field and looking for signals that exceed some threshold. By switching the illumination and the detection system to the other half of the field, clear defects can be detected on the reticle 20 and opaque defects on the duplicate 24. Once the defects have been located, it is a straightforward matter to determine if they are on the reticle 20 or the duplicate 24.

For example, by illuminating the reticle 20 directly and looking at it directly, the existence and nature of a defect should become apparent.

In the context of the description thus far, consider a defect as an irregular patch of extra or missing reflector, but in a broader context a defect could be a pattern edge out of place or an overlay error. The present invention will also find overlay errors between the original and duplicate patterns 20, 24 and should be capable of measuring overlay to at least one tenth of the minimum geometry size (0.025 microns).

This is done by globally aligning the two patterns by finding the reticle position that minimizes the total light transmission through one pattern when the other is illuminated.

Now any motion of the reticle 20 from the global position that is required to bring the intensity of an edge up to or down to a nominal value corresponding to correct alignment is the overlay error for those edges. A desirable property of this technique is that it can be employed in such a way as to find worst case defects e threshold value without much computation or the need for a large, specially prepared data base. The latter is provided by the duplicate pattern 24.

FIG. 2 illustrates a portion of FIG. 1 with the reticle pattern 20, duplicate rotated pattern 24 and a blank space 26 for printing the reticle pattern 20.

The present invention provides an optical system that can take all of a reticle pattern and image that reticle pattern 20 onto a complementary pattern 24 so As previously described prior art systems essentially take a small portion of a reticle and image it onto a complementary small portion of another reticle. Other approaches look at one pixel at a time, which are extremely slow.

Although they can find defects such as a nick out of a line, a missing corner or the like, such techniques cannot determine a gradual shift in the location of a portion of the pattern away from its ideal location. Such techniques depend upon the reticle pattern to have a certain degree of fidelity. They are useful for finding a clearly evident defect of some kind such as an extra piece of chrome, a missing piece of chrome, a bite or a spot, but conventional techniques have trouble determining more subtle long range errors or overlay errors.

In the present invention, one reticle pattern image is exactly on top of another pattern and any difference in the position of all of those edges winds up as a readily detectible signal.

One can simply scan the result of the imagery of one pattern on another and, with appropriate hardware logic, sift out all of the data that is not of interest, and very quickly detect those points that are likely to have an error whether it be in the location of an edge, a missing piece of chrome, an extra piece of chrome or the like. The present invention can provide a full allows for obtaining interesting data directly so that one does not have to deal with literally billions of pixels when one can deal with a few hundred potential defects and sift through them to find out if in fact they are a defect or whether they are marginal.

The present invention allows for the taking of one pattern and imaging it in an extremely low distortion system. One of the advantages of the present invention is in fact that it has very few surfaces and the distortion is very low. When an image from one field is imaged on top of another, they fit extremely well. In fact one can measure directly the fidelity of the patterns being compared rather than the fidelity of the system that is doing the measurement.

Prior art approaches only image a small portion of a field on top of a small portion such that there can be misregistrations from one part of the field to another which are not detectible.

The light illuminating the object and the way of viewing the image can be done with a variety, of different techniques. One can use bright field (FIG. 3a) or dark field (FIG. 3b) illumination and other different ways of enhancing or improving the image. One significant feature of the present invention is that there is a field size that is sufficiently large to image a complete reticle field onto another complementary pattern.

Figure 3B:
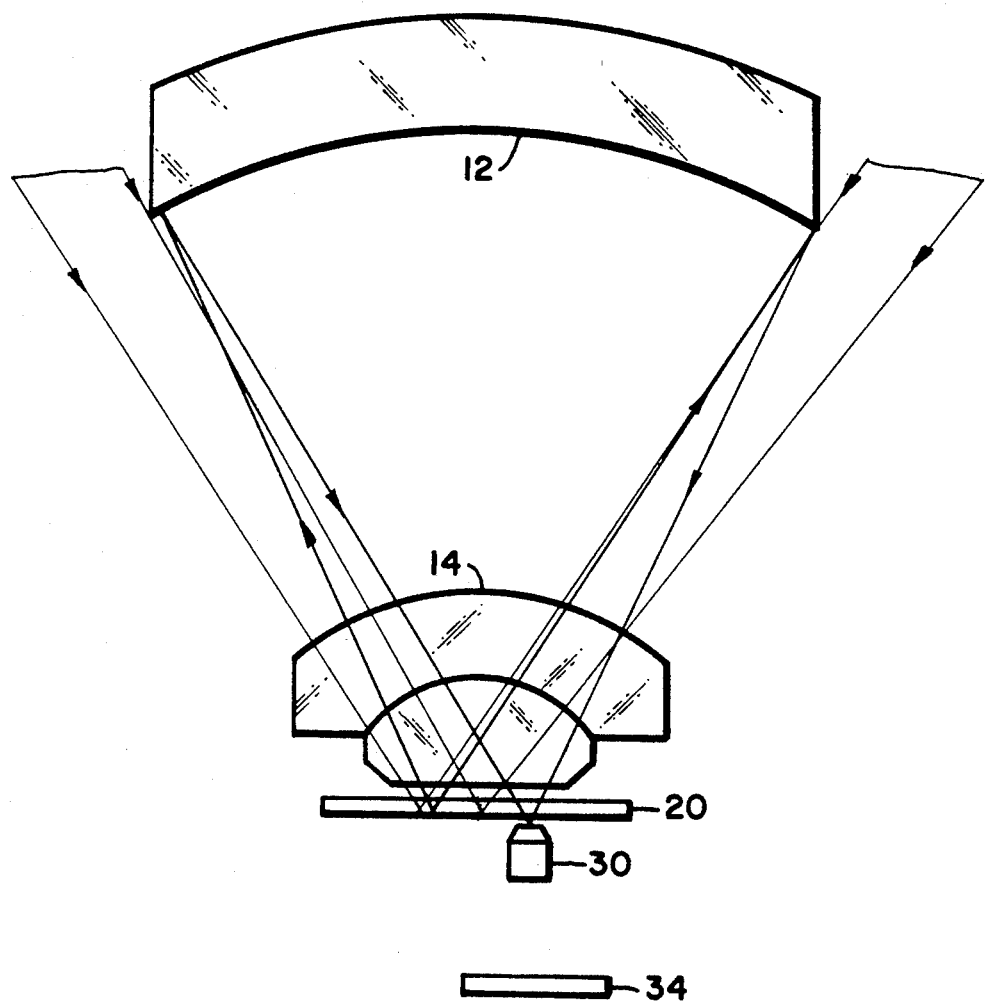

The foregoing descriptions of specific embodiments of the present invention have been presented for purposes of illustration and description. They are not intended to be exhaustive or to limit the invention to the precise forms disclosed, and it should be understood that many modifications and variations are possible in light of the above teaching. For example, the illumination could be a dark field (FIG. 3b) coming from an annulus around primary mirror 12 rather than through a beam splitter coating on primary mirror 12 (FIG. 3a). The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A photolithographic projection optical system comprising:
   means for illuminating one-half of an optical field containing a first reticle pattern to be inspected,
   means for re-imaging light reflected from the entire reticle pattern onto the other half of said optical field containing a second complementary reticle pattern, and
   means for directly comparing or viewing the image of the first reticle pattern after being blocked by the second complementary pattern to provide a measure of the fidelity between said reticle patterns themselves.

2. A system as in claim 1 wherein photolithographic projection optical said system is a half field Dyson optical system.

3. A system as in claim 2 including detector array means for comparing said image patterns.

4. A system as in claim 1 where said means for illuminating is a dark field and comes from an annulus around a primary mirror.

5. In a photolithographic projection optical system, the method comprising the steps of:
   illuminating one-half of a projection system optical field containing a first reticle pattern to be inspected,
   re-imaging light reflected from the entire first reticle pattern onto the other half of said optical field containing a second complementary reticle pattern, and
   directly comparing or viewing the imagery patterns of said first pattern after superimposing on said complementary second pattern to provide a measure of the fidelity between said reticle patterns.

* * * * *